United States Patent
Yoon et al.

(10) Patent No.: US 7,577,719 B2
(45) Date of Patent: Aug. 18, 2009

(54) METHOD FOR CONTROLLING HOME AUTOMATION SYSTEM

(75) Inventors: Hong Shik Yoon, Changwon-shi (KR); Seung Myun Baek, Changwon-shi (KR); Koon Seok Lee, Changwon-shi (KR); Hwan Jong Choi, Changwon-shi (KR)

(73) Assignee: LG Electronics Inc., Seoul (KR)

( * ) Notice: Subject to any disclaimer, the term of this patent is extended or adjusted under 35 U.S.C. 154(b) by 587 days.

(21) Appl. No.: 10/506,074

(22) PCT Filed: Apr. 10, 2002

(86) PCT No.: PCT/KR02/00657

§ 371 (c)(1),
(2), (4) Date: Aug. 31, 2004

(87) PCT Pub. No.: WO03/085896

PCT Pub. Date: Oct. 16, 2003

(65) Prior Publication Data

US 2005/0131553 A1    Jun. 16, 2005

(51) Int. Cl.
*G06F 15/173*    (2006.01)
*G06F 15/16*    (2006.01)
*G06F 9/24*    (2006.01)
*G06F 15/177*    (2006.01)
*G06F 9/00*    (2006.01)
*G06F 1/24*    (2006.01)
*G06F 3/00*    (2006.01)

(52) U.S. Cl. .............. 709/219; 709/203; 709/218; 709/224; 709/249; 713/1; 713/100; 715/735

(58) Field of Classification Search ............... 709/203, 709/217–220, 223, 224, 249; 713/1, 2, 100; 715/733–736
See application file for complete search history.

(56) References Cited

U.S. PATENT DOCUMENTS 6,121,593 A * 9/2000 Mansbery et al. ............ 219/679

(Continued)

FOREIGN PATENT DOCUMENTS

| JP | A 2-255576 | 10/1990 |
| JP | A 5-85856 | 4/1993 |
| JP | B2 2543565 | 7/1996 |
| JP | A 11-79851 | 3/1999 |
| JP | 2000-175278 | 6/2000 |
| WO | WO 01/54406 A1 | 7/2001 |
| WO | WO 01/71489 A1 | 9/2001 |

OTHER PUBLICATIONS

Daneels, J., How Deep Sub Micron Will Boost Internet Appliances in the Digital Home Network, Technical Digest Int'l, Electron Devices Meeting, Dec. 2-5, 2001, p. 1.1.1-1.1.7, ISBN 0-7803-7050-3.

(Continued)

*Primary Examiner*—Vivek Srivastava
*Assistant Examiner*—Melvin H Pollack
(74) *Attorney, Agent, or Firm*—McKenna Long & Aldridge LLP

(57) ABSTRACT

A method for controlling a home automation system is disclosed, in which web sites, a PC trying to connect to the web sites, and electric home appliances connected to the PC are provided. The home automation system includes a step for trying to communicate with electric home appliances and web sites once a user operates an internet operating program; a step for opening a main web page, analyzing commands for a button clicked by a user with reference to the main web page, and performing a controlling operation according to the analyzed result if the PC is connected to the web sites; and a step for opening a local page stored in PC and opening a corresponding link page according to a button clicked by a user if the PC is connected only to electric home appliances without being connected to the web sites.

6 Claims, 3 Drawing Sheets

U.S. PATENT DOCUMENTS

| | | | | |
|---|---|---|---|---|
| 6,288,716 | B1* | 9/2001 | Humpleman et al. | 715/733 |
| 6,359,270 | B1* | 3/2002 | Bridson | 219/679 |
| 6,603,488 | B2* | 8/2003 | Humpleman et al. | 715/771 |
| 6,615,088 | B1* | 9/2003 | Myer et al. | 700/20 |
| 6,756,998 | B1* | 6/2004 | Bilger | 715/764 |
| 6,799,198 | B1* | 9/2004 | Huboi et al. | 709/203 |
| 6,857,009 | B1* | 2/2005 | Ferreria et al. | 709/219 |
| 6,912,579 | B2* | 6/2005 | Byrnes et al. | 709/227 |
| 6,949,729 | B1* | 9/2005 | Ishikawa et al. | 219/702 |
| 7,016,962 | B2* | 3/2006 | Hertling et al. | 709/227 |
| 7,039,858 | B2* | 5/2006 | Humpleman et al. | 715/205 |
| 7,043,532 | B1* | 5/2006 | Humpleman et al. | 709/208 |
| 7,130,895 | B2* | 10/2006 | Zintel et al. | 709/220 |
| 7,181,510 | B2* | 2/2007 | Emerson et al. | 709/222 |
| 7,191,236 | B2* | 3/2007 | Simpson-Young et al. | 709/228 |
| 7,197,011 | B2* | 3/2007 | Fong | 370/252 |
| 7,200,683 | B1* | 4/2007 | Wang et al. | 709/250 |
| 7,213,061 | B1* | 5/2007 | Hite et al. | 709/223 |
| 7,240,102 | B1* | 7/2007 | Kouznetsov et al. | 709/220 |
| 7,243,132 | B2* | 7/2007 | Choi | 709/208 |
| 7,257,821 | B2* | 8/2007 | Wendorf et al. | 719/328 |
| 7,337,217 | B2* | 2/2008 | Wang | 709/217 |
| 2002/0016969 | A1* | 2/2002 | Kimble | 725/87 |
| 2002/0035404 | A1* | 3/2002 | Ficco et al. | 700/65 |
| 2002/0083153 | A1* | 6/2002 | Sweatt et al. | 709/218 |
| 2002/0083342 | A1* | 6/2002 | Webb et al. | 713/201 |
| 2003/0009537 | A1* | 1/2003 | Wang | 709/219 |
| 2003/0097469 | A1* | 5/2003 | Blair et al. | 709/239 |
| 2003/0135604 | A1* | 7/2003 | Harrison et al. | 709/224 |
| 2003/0169289 | A1* | 9/2003 | Holt et al. | 345/735 |
| 2003/0208558 | A1* | 11/2003 | Venkatraman et al. | 709/218 |
| 2004/0039795 | A1* | 2/2004 | Percival | 709/218 |

OTHER PUBLICATIONS

Saito, T., et al., Home Gateway Architecture and Its Implementation, IEEE Transactions on Consumer Electronics, vol. 46, Issue 4, Nov. 2000, pp. 1161-1166, ISSN 0098-3063.

Yoshida, R., Ex Web: Remotely Operating Devices in the Home Network, IEEE $4^{th}$ Int'l Workshop on Networked Appliances, 2002 Proceedings, Jan. 15-16, 2002, pp. 267-274, ISBN 0-7803-7259-X.

* cited by examiner

METHOD FOR CONTROLLING HOME AUTOMATION SYSTEM

TECHNICAL FIELD

The present invention relates to a home automation system, more particularly, to a method for controlling a home automation system.

BACKGROUND ART

In general, electric home appliances that are broadly used at home include television, refrigerator, washing machine, microwave, air conditioner and so one. These appliances have an independent controller, respectively, or an operation unit mounted in the main body of an apparatus. Hence, a user can control operation of a corresponding appliance by a remote control thereof, or an operation unit in each apparatus.

If one remote controller is assigned to every apparatus, it means that the user will have to have remote controllers as many as the apparatuses he/she possessed. Obviously it is not easy to keep or manage that many remote controllers. Above all, it will be very hard to remember which remote controller belongs to which appliance every time. Hence, the conventional art has a defect in that those independently controlled electric home appliances cannot be integrated nor optimized.

To overcome the problems, some tried to mount a protocol like TCP (transfer control protocol/IP (internet protocol) at each appliance for remote control, but each appliance's micom function and memory capacity were far from qualification.

DISCLOSURE OF INVENTION

It is, therefore, an object of the present invention to provide a method for controlling a home automation, which enables users to distinguish a web page to connect to a general browser or Internet operating program and control PC hardware.

To achieve the above object, there is provided the method for controlling a home automation system in which web sites, a PC trying to connect to the web sites, and electric home appliances connected to the PC are provided, the method including the steps of: trying to communicate with electric home appliances and web sites once a user operates an internet operating program; opening a main web page, analyzing commands for a button clicked by a user with reference to the main web page, and performing a controlling operation according to the analyzed result if the PC is connected to the web sites; and opening a local page stored in PC and opening a corresponding link page according to a button clicked by a user if the PC is connected only to electric home appliances without being connected to the web sites.

BRIEF DESCRIPTION OF DRAWINGS

The above objects, features and advantages of the present invention will become more apparent from the following detailed description when taken in conjunction with the accompanying drawings, in which.

BEST MODE FOR CARRYING OUT THE INVENTION

A preferred embodiment of the present invention will now be described with reference to the accompanying drawings.

Figure 1:
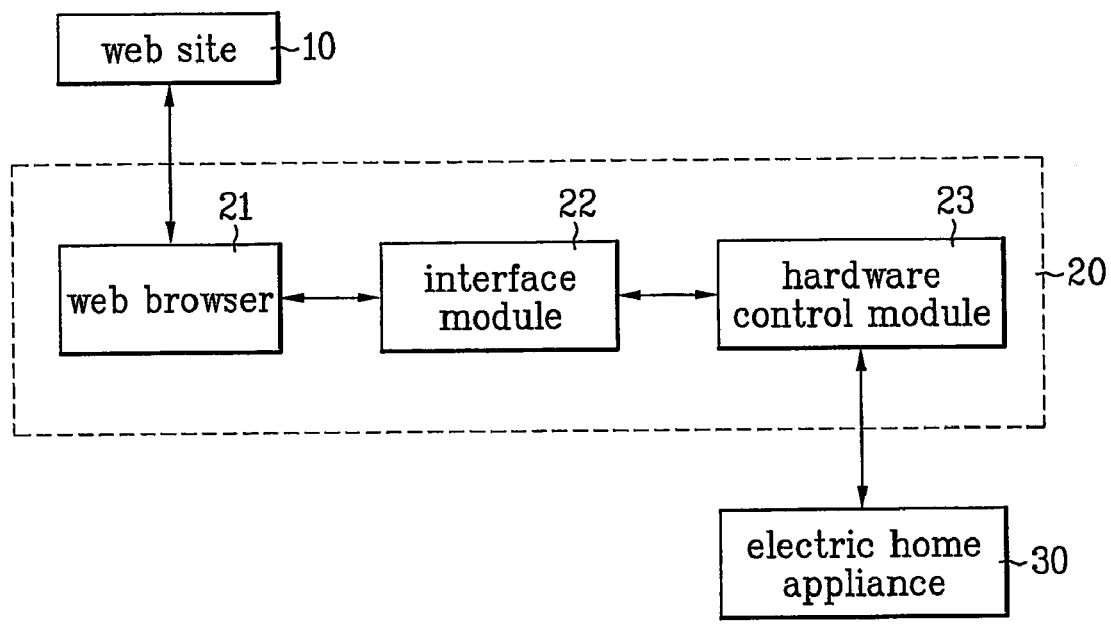
FIG. 1 is a block diagram illustrating a home automation system in accordance with the present invention.
Figure 2:
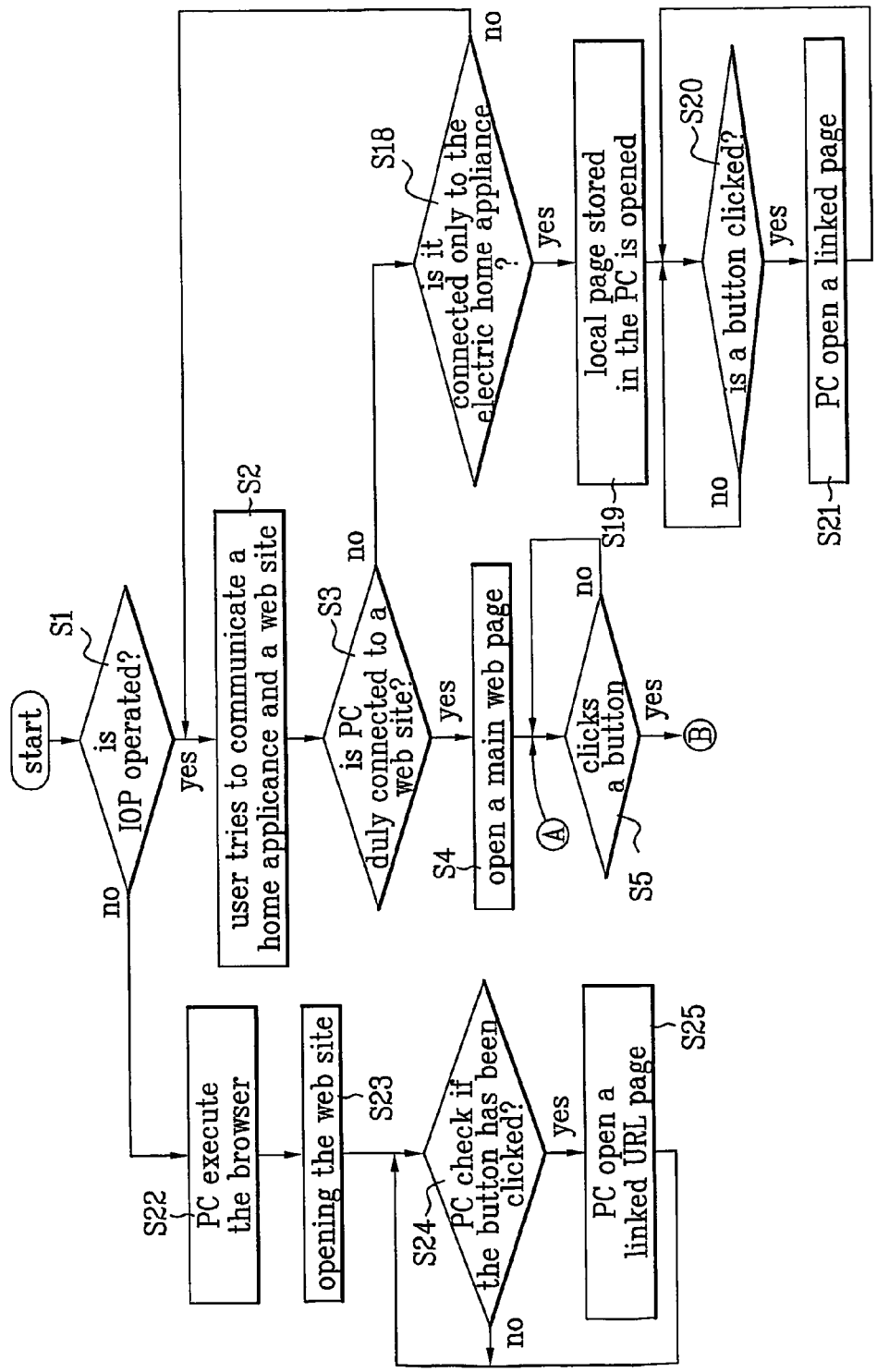
FIG. 2 is a flow chart explaining a method for controlling the home automation system in accordance with the present invention.
Figure 2:
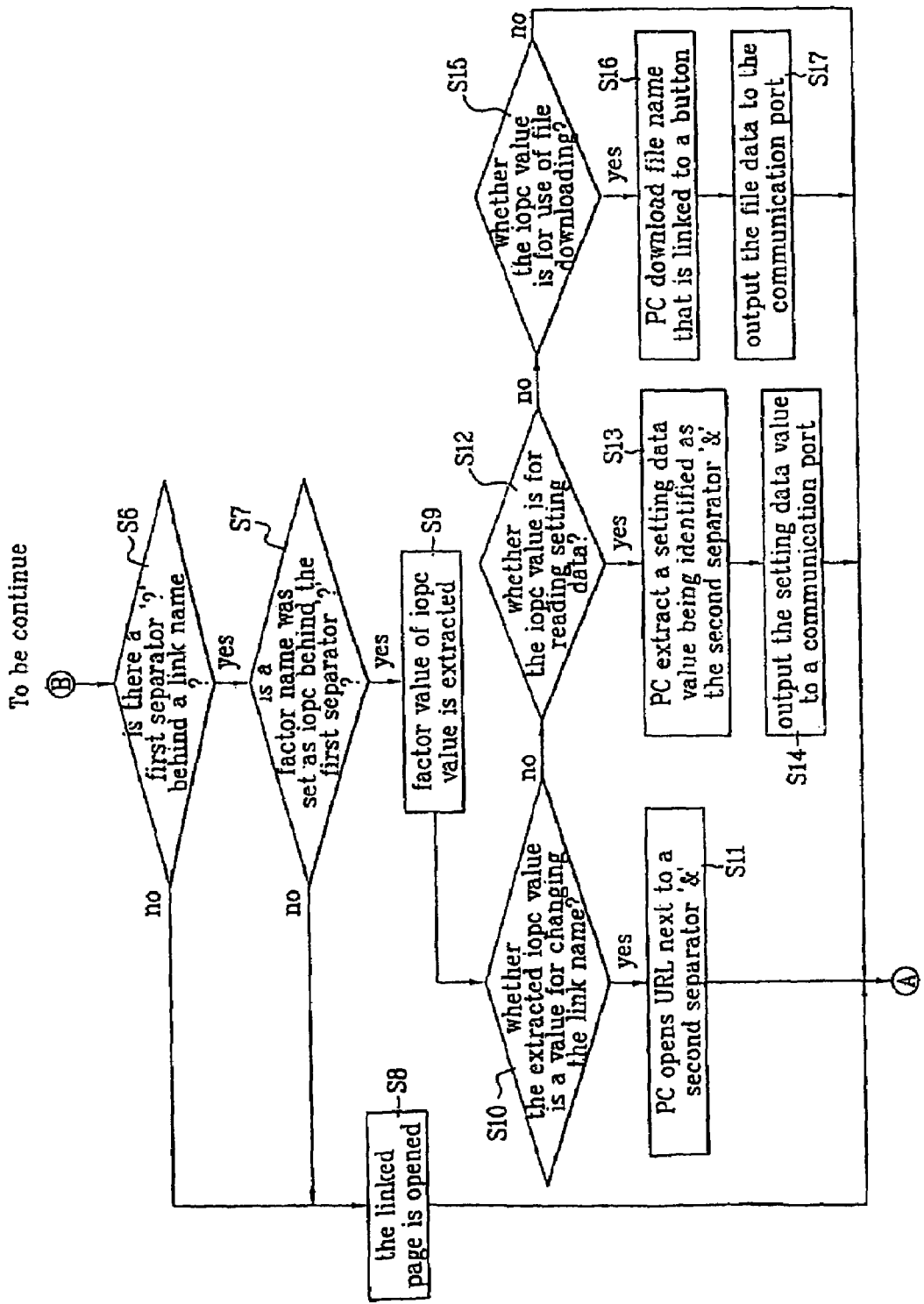

FIG. 1 is a block diagram illustrating a home automation system in accordance with the present invention, and FIG. 2 is a flow chart explaining a method for controlling the home automation system in accordance with the present invention.

As shown in FIG. 1, the home automation system embodying the principles of the present invention includes web site 10 composed of files that can be interpreted in a web browser, and data files for controlling electric home appliances, Internet operating program (IOP) for connecting web site and electric home appliances 10, and PC 20 for controlling a corresponding home electric appliance, and PC 20 for controlling the corresponding home electric appliance.

IOP stored in PC 20 includes a web browser 21 for interpreting web pages composed of HTML or Java and then displaying the interpreted web pages on a screen, a hardware control model 23 for outputting data needed to control electric home appliance 30 to a communication port of PC or reading signals sent from electric home appliance 30 to the communication port of PC 20, and an interface module 22 for connecting data between the web browser 21 and the hardware control module 23.

Usually, electric home appliance 30 has a communication port for communication with PC. Preferably, RS-232 is used as communication port to connect electric home appliance and PC.

Now, the method for controlling the home automation system described above is explained with reference to FIG. 2. As depicted in the drawing, it if first found out whether a user operated IOP (S1).

Next, if IOP is being operated, the user tries to communicate with electric home appliances and web sites (S2).

After trying the communication (S2), the user finds out whether PC is duly connected to a web site (S3).

If it turns out that the PC is connected to a web site (S3), the PC opens a main web page (S4).

When the user clicks a button on the main web page, the PC determines whether there exists a first separator ('?') behind a link name (S5~S6).

As a result, if there is the first separator ('?'), the PC finds out whether factor name has been set as 'iopc' behind the first separator ('?') (S7).

If the first separator ('?') does not exist or the factor name 'iopc' has not been designated, the linked page is opened (S8).

On the other hand, if the factor name has been designated as 'iopc', factor value thereof, namely 'iopc' value, is extracted (S9).

Then, the PC determines whether the extracted 'iopc' value is a value for changing the link name (S10).

If the extracted 'iopc' value turns out to be the value for changing the link name at step 10, the PC opens URL next to a second separator ('&') (S11).

In the meantime, if the extracted 'iopc' value is not the value for changing the link name, the PC determines whether the 'iopc' value is for reading setting data (S12).

If it turns out that the extracted 'iopc' value is for reading setting data, the PC extracts a setting data value being identified as the second separator ('&') and outputs the setting data value to a communication port (S13~S14).

However, if 'iopc' value is not for reading setting data, the PC determines whether the 'iopc' value is for use of file downloading (S15).

If 'iopc' value is for downloading files at step 15, the PC downloads file name that is linked to a button clicked by the user, and outputs the file data to the communication port (S16~S17).

In the meantime, as a result of decision made at step 3, if the PC is not connected to the web site, the user checks whether it is connected only to the electric home appliance (S18).

If it turns out that the PC is connected only to the electric home appliance, a local page stored in the PC is opened (S19).

And then, the PC determines whether a button has been clicked at that opened local page (S20).

If the button has been clicked by the user, the PC opens a linked page (S21).

However, if it is found out that the IOP is not driven at step 1, this means that a general web browser is to be driven. Therefore, the PC executes the browser (S22).

After opening the web page, the PC checks if the button has been clicked (S24).

If the button is clicked, the PC opens a linked URL page (S25).

As described above, in case of controlling/monitoring electric home appliances through IOP, the user needs to click link buttons on the web sites. Here, if link names are not of control buttons, the web sites can have only link page information. However, if link buttons are for control buttons, the web sites can get information only IOP can interpret in addition to the link page.

At this time, information for link pages and IOP is identified as the first separator '?'.

Next to the first separator '?' comes a factor and the factor's value, the factor meaning information for IOP.

In fact, the very next factor after the first separator '?' is the command for running IOP.

Following the command, there are variable names and values thereof to execute the command as the second separator '&'. Using the command and the variable values to execute the command, IOP opens a separate web page, or downloads relevant files and outputs them to the communication port.

The above would be more clear with reference with the following embodiments 1 and 2.

Embodiment 1

Suppose that there is something that looks like <Aherf="explorer.html?iopc=redirect&http://www.lg-dream.com/iop.html>downloadingdata</A>.

Here, the button the user clicked is 'download', and the link page is 'explorer.html'. That is, when the user clicks a button by accessing to the explorer, an 'explorer.html' page is opened.

On the other hand, when the user uses IOP, the PC recognizes the factor iopc next to the first separator '?', and reads the iopc value 'redirect', and recognizes the 'redirect' as a value next to the second separator '&'.

In short, another link page 'http://www.lgdream.com/iop.html' is opened.

Embodiment 2

Suppose that there is something that looks like <Aherf="fileURL/file.zip?iopc=filefunction">downloadingfile</a>.

Here, the user inputted the button 'downloadingfile', and if the user accesses to the explorer and clicks the button, he/she can download 'file.zip' file to the PC. On the other hand, if the user accesses to IOP and clicked the button, the factor iopc after the first separator '?' is recognized, and the iopc value, filefunction' is read. Next, the 'file.zip' file is downloaded to the PC, and the same file is outputted to the communication port.

To summarize, web pages of web sites have buttons for linking other pages, and link information of each button includes a web page to be opened, a separate page that is separated by the first and second separators, e.g., '?' and '&', or information on data. When the user clicks the buttons by access to a web page through a general web browser and IOP, the general browser opens link pages, and IOP opens a separate page according to the information that comes next to the first separator '?' or outputs data to the communication port.

While the invention has been shown and described with reference to certain preferred embodiments thereof, it will be understood by those skilled in the art that various changes in form and details may be made therein without departing from the spirit and scope of the invention as defined by the appended claims.

INDUSTRIAL APPLICABILITY

The method for controlling a home automation system can be advantageously used for separating link pages through a general browser and Internet operating program, given that the web page is the same. Also, the method makes it possible to control PC hardware that used to be impossible by the general browser, thereby controlling a wanted appliance more promptly.

What is claimed is:

1. A method for controlling a home automation system having web sites, a PC to connect to the web sites, and electric home appliances connected to the PC, the method comprising the steps of:
   determining if an Internet operating program is operating, wherein the Internet operating program includes a web browser for interpreting a web page, and a hardware control module for outputting data to control the electric home appliance to the PC and reading signals sent from the electric home appliance to the PC, and an interface module for connecting data between the web browser and the hardware control module;
   opening a main web page, analyzing commands for a button clicked by a user with reference to the main web page, and performing a controlling operation according to the analyzed result, after determining that the Internet operating program is operating and the PC is connected to web sites; and
   opening a local page stored in the PC and opening a corresponding link page according to a button clicked by a user, after determining that the Internet operating program is operating, the PC is connected to electric home appliances, and that the PC is not connected to the web sites,
   executing a general web browser other than the web browser included in the Internet operating program after determining that the Internet operation program is not operated.

2. The method according to claim 1, wherein the step for performing a controlling operation according to the analyzed result comprises the sub-steps of:
   if a user clicks a button on the main web page, determining whether a first separator exists after a link name;
   if the first separator exists after the link name, determining whether a factor name is a pre-designated factor after the first separator;

if the factor name is a pre-designated factor, extracting a factor value and performing a controlling operation according to the factor value; and if the separator does not exist and the factor name is not a pre-designated factor, opening a link page.

3. The method according to claim 2, wherein the first separator is '?', and the factor name is 'iopc'.

4. The method according to claim 2, wherein the step for performing a controlling operation according to the factor value comprises the sub-steps of:

if the factor value designates changing the link name, opening a URL next to a second separator;

if the factor value designates reading setting data, extracting setting data that is separated by the second separator, and outputting the setting data to a communication port; and if the factor value designates downloading a file, downloading the linked file name to the PC, and outputting file data to the communication port.

5. The method according to claim 4, wherein the second separator is '&'.

6. The method according to claim 1, further comprising the steps of:

if the general web browser is executed, opening another web page; and if a button is clicked on the opened another web page, opening a linked page.

* * * * *